(12) United States Patent
Shin et al.

(10) Patent No.: US 11,307,803 B2
(45) Date of Patent: Apr. 19, 2022

(54) STORAGE DEVICE FOR SUSPENDING PROGRAM OPERATION AND PERFORMING READ OPERATION AND OPERATING METHOD THEREOF

(71) Applicant: SK hynix Inc., Icheon-si Gyeonggi-do (KR)

(72) Inventors: Beom Ju Shin, Suwon-si Gyeonggi-do (KR); Yun Jung Yeom, Gunpo-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 53 days.

(21) Appl. No.: 16/821,749

(22) Filed: Mar. 17, 2020

(65) Prior Publication Data
US 2021/0072922 A1 Mar. 11, 2021

(30) Foreign Application Priority Data

Sep. 6, 2019 (KR) .................. 10-2019-0110935

(51) Int. Cl.
*G06F 3/06* (2006.01)
*G06F 9/48* (2006.01)

(52) U.S. Cl.
CPC .......... *G06F 3/0659* (2013.01); *G06F 3/0604* (2013.01); *G06F 3/0673* (2013.01); *G06F 9/485* (2013.01)

(58) Field of Classification Search
CPC ...... G06F 3/0604; G06F 3/061; G06F 3/0626; G06F 3/0656; G06F 3/0658; G06F 3/0659; G06F 3/0673; G06F 3/0679; G06F 9/485; G06F 12/0802; G06F 12/0882; G06F 12/10; G06F 13/1668; G11C 16/0483; G11C 16/10
See application file for complete search history.

(56) References Cited

U.S. PATENT DOCUMENTS

| | | | |
|---|---|---|---|
| 2009/0019239 A1* | 1/2009 | Allison | G06F 13/1642 711/151 |
| 2016/0313946 A1* | 10/2016 | Zang | G06F 3/0679 |
| 2020/0034061 A1* | 1/2020 | Khalili | G06F 3/068 |

FOREIGN PATENT DOCUMENTS

| KR | 1020150017599 A | 2/2015 |
|---|---|---|
| KR | 1020150080819 A | 7/2015 |

* cited by examiner

*Primary Examiner* — Larry T Mackall
(74) *Attorney, Agent, or Firm* — William Park & Associates Ltd.

(57) ABSTRACT

A memory controller for controlling a memory device for storing data, the memory controller, the memory controller comprising: a request transmitter for providing a program suspend request for suspending a program operation, when the memory device receives a read request from a host while the memory device is performing the program operation and a command controller for generating and outputting a program suspend command, based on the program suspend request, and outputting a cache read command or normal read command, based on a number of commands corresponding to a request received from the host, which are queued in a command queue.

16 Claims, 17 Drawing Sheets

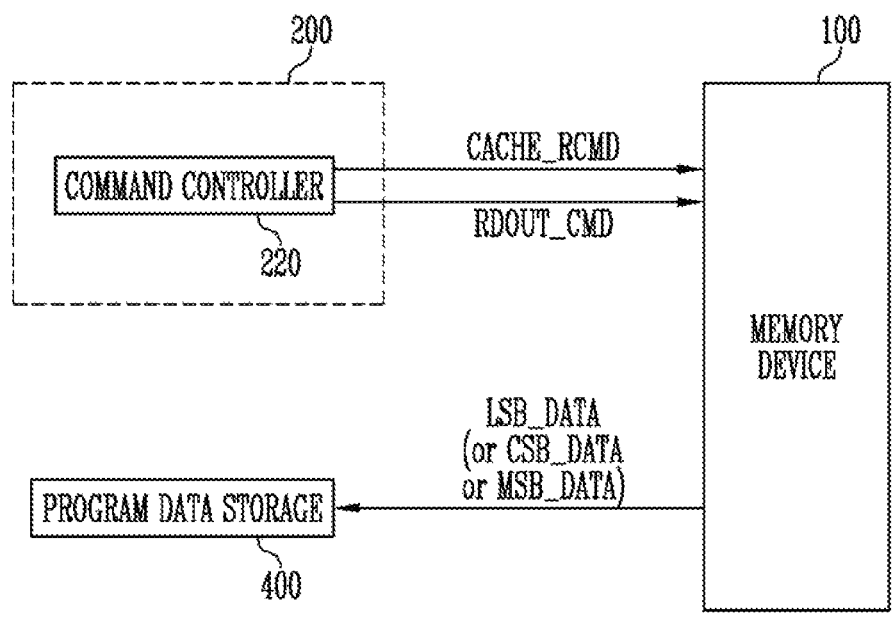

STORAGE DEVICE FOR SUSPENDING PROGRAM OPERATION AND PERFORMING READ OPERATION AND OPERATING METHOD THEREOF

CROSS-REFERENCE TO RELATED APPLICATION

The present application claims priority under 35 U.S.C. § 119(a) to Korean patent application number 10-2019-0110935 filed on Sep. 6, 2019, in the Korean Intellectual Property Office, the entire disclosure of which is incorporated herein by reference.

BACKGROUND

1. Technical Field

The present disclosure generally relates to an electronic device, and more particularly, to an electronic storage device and an operating method thereof.

2. Related Art

A storage device is a device configured to store data under the control of a host device such as a computer, a smart phone, or a smart pad. The storage device includes a device configured to store data on a magnetic disk, such as a Hard Disk Drive (HDD), and a device configured to store data in a semiconductor memory, i.e., a nonvolatile memory, such as a Solid State Drive (SSD) or a memory card.

The storage device may include a memory device configured to store data and a memory controller configured to control the memory device. The memory device is classified as a volatile memory device or a nonvolatile memory device. The nonvolatile memory device includes a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

In accordance with an embodiment of the present disclosure, a storage device includes a memory device for storing data, a memory controller for controlling the memory device, and program data storage for communicating with the memory device. The memory device includes a page buffer in which data is temporarily stored. The memory controller includes a request transmitter configured to provide a program suspend request for suspending a program operation, when the memory device receives a read request from a host while the memory device is performing the program operation. The memory controller also includes a command controller configured to generate and output a program suspend command, based on the program suspend request, and output a cache read command or normal read command, based on a number of commands of a command queue in which a command corresponding to the request received from the host is queued. The program data storage stores data output from the memory device to perform an operation corresponding to the cache read command.

In accordance with another embodiment of the present disclosure, is a method for operating a storage device including a memory device for storing data, a memory controller for controlling the memory device, and program data storage for communicating with the memory device. The method includes: receiving a read request from a host while the memory device is performing a program operation; generating a program suspend command for suspending the program operation, based on the read request; and performing a read operation corresponding to a cache read command or normal read command, based on a number of commands of a command queue in which a command corresponding to the request received from the host is queued, when the program operation is suspended.

In accordance with still another embodiment of the present disclosure is a memory controller for controlling a memory device for storing data. The memory controller includes a request transmitter configured to provide a program suspend request for suspending a program operation, when the memory device receives a read request from a host while the memory device is performing the program operation. The memory controller also includes a command controller configured to generate and output a program suspend command, based on the program suspend request, and output a cache read command or normal read command, based on a number of commands corresponding to a request received from the host, which are queued in a command queue.

In accordance with still another embodiment of the present disclosure, a storage device includes data storage for storing data, wherein the data storage includes a page buffer in which data is temporarily stored. The storage device further includes an operation controller for controlling the data storage. The operation controller includes: a request transmitter configured to provide a program suspend request for suspending a program operation, when the data storage receives a read command while the data storage is performing the program operation; a command controller configured to generate and output a program suspend command, based on the program suspend request, and a cache read command or normal read command, based on a number of commands of a command queue in which the received command is queued; and program data storage configured to store data output from the data storage to perform an operation corresponding to the cache read command.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 6A and 6B are diagrams illustrating a process in which a cache read command is output based on a number of read commands queued in a command queue.

DETAILED DESCRIPTION

Any specific structural or functional description disclosed herein is merely illustrative for the purpose of describing embodiments according to the concept of the present disclosure. The embodiments can be implemented in various forms, and should therefore not be construed as limiting the teachings set forth herein.

Hereinafter, various embodiments of the present disclosure are described in detail with reference to the accompanying drawings in order to enable those skilled in the art to readily implement the teachings of the present disclosure. Some embodiments involve a method capable of performing a cache read operation without adding any latch in program suspend.

Figure 1:
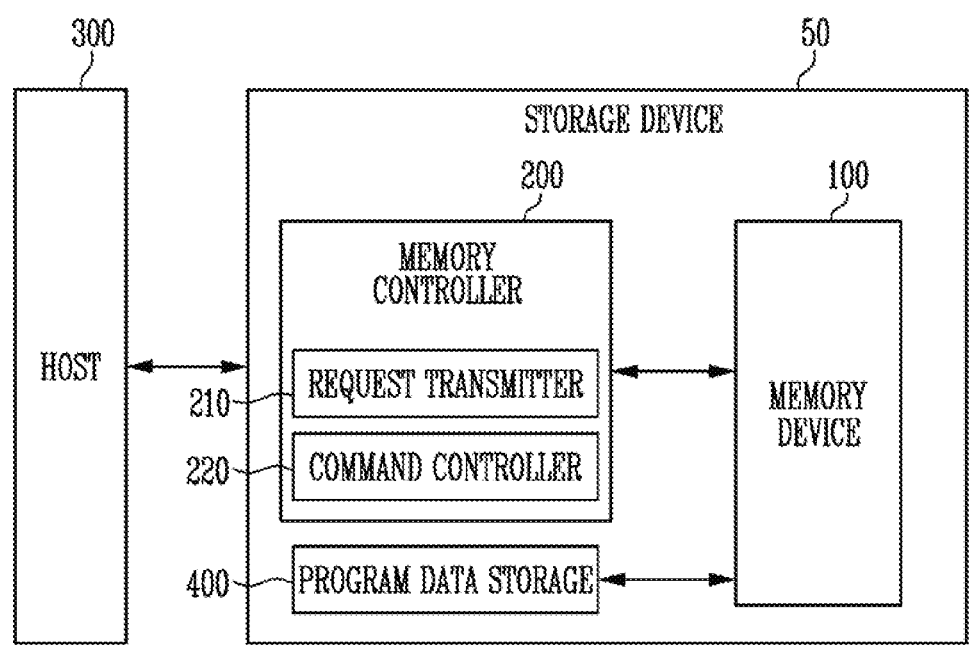
FIG. 1 is a block diagram illustrating a storage device.

FIG. 1 is a block diagram illustrating a storage device 50.

Referring to FIG. 1, the storage device 50 may include a memory device 100 and a memory controller 200.

The storage device 50 may be a device for storing data under the control of a host 300, such as a mobile phone, a smart phone, an MP3 player, a laptop computer, a desktop computer, a game console, a TV, a tablet PC, or an in-vehicle infotainment system.

The storage device 50 may be manufactured as any one of various types of storage devices according to a host interface that is a communication scheme with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells, and the plurality of memory cells may constitute a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

In an embodiment, the memory device 100 may be implemented in a two-dimensional array structure or three-dimensional array structure. Hereinafter, a case where the memory device 100 is implemented in the three-dimensional array structure is described as an embodiment, the present disclosure is not limited to the three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, the memory device 100 may be operated using a Single-Level Cell (SLC) scheme in which one data bit is stored in one memory cell. Alternatively, the memory device 100 may be operated using a scheme in which at least two data bits are stored in one memory cell. For example, the memory device 100 may be operated using a Multi-Level Cell (MLC) scheme in which two data bits are stored in one memory cell, a Triple-Level Cell (TLC) scheme in which three data bits are stored in one memory cell, or a Quadruple-Level Cell (QLC) scheme in which four data bits are stored in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

The memory controller 200 may include a request transmitter 210. The request transmitter 210 may receive a request from the host 300. In an embodiment, the request transmitter 210 may receive a request from the host 300, even while the memory device 100 is performing a program operation. The request received from the host 300 may be transferred to a command controller 220. The command controller 220 may generate a command, based on the request received from the request transmitter 210, and output the generated command to the memory device 100.

The request transmitter 210 may transmit a program suspend request to the command controller 220 by comparing a time required to perform an operation corresponding to the request received from the host 300 with a time required to complete the program operation. That is, the request transmitter 210 may determine whether the program operation being performed by the memory device 100 is to be suspended by latencies of the respective operations.

Specifically, when the request transmitter 210 receives a read request from the host 300 while the memory device 100 is performing a program operation, the request transmitter 210 may determine a time required to perform a read operation corresponding to the read request and a time required to complete the program operation being performed by the memory device 100. The request transmitter 210 may transmit a program suspend request to the command controller 220, based on the determined times.

For example, when the time required to perform the read operation is shorter than the time required to complete the program operation, the request transmitter 210 might not transmit the program suspend request to the command controller 220. That is, because the program operation has a long latency, the request transmitter 210 might not transmit the program suspend request to the command controller 220. On the contrary, when the time required to perform the read operation is longer than the time required to complete the program operation, the request transmitter 210 may transmit the program suspend request to the command controller 220. That is, because the read operation has a long latency, the request transmitter 210 may transmit the program suspend request to the command controller 220.

The memory controller 200 may include the command controller 220. The command controller 220 may generate a command corresponding to an operation to be performed by the memory device 100 and output the generated command to the memory device 100. That is, the command controller 220 may receive a request received from the host 300 through the request transmitter 210, and generate a command corresponding to the request and then output the generated command to the memory device 100. The command controller 220 may manage the generated command through a command queue.

In an embodiment, when the command controller 220 receives a program suspend request from the request transmitter 210 while the memory device 100 is performing a program operation, the command controller 220 may generate a program suspend command for suspending the program operation and output the generated program suspend command to the memory device 100.

After the command controller 220 outputs the program suspend command, the command controller 220 may generate a normal read command or cache read command, based on a number of commands queued in a command queue, and output the generated normal read command or cache read command to the memory device 100. Before the command controller 220 outputs the cache read command to the memory device 100, the command controller 220 may output a random data output command for reading data stored in the memory device 100.

In an embodiment, when it is determined that performance of an operation corresponding to the cache read command is suspended, the command controller 220 may output a cache read suspend command to the memory device 100. After the command controller 220 outputs the cache read suspend command to the memory device 100, the command controller 220 may output, to the memory device 100, a random data input command for re-performing the program operation suspended by the memory device 100.

The storage device 50 may include program data storage 400. When the memory device 100 receives a program suspend command from the memory controller 200 during a program operation, and it is determined that a cache read operation is performed, the program data storage 400 may store data output from the memory device 100.

In an embodiment, before the cache read operation is performed, any one data among data stored in the memory device 100, i.e., Least Significant Bit (LSB) data, Central Significant Bit (CSB) data, and Most Significant Bit (MSB) data, may be transmitted to the program data storage 400 to be stored in the program data storage 400. When the data is stored in the program data storage 400, the memory device 100 may perform the cache read operation.

After the cache read operation is ended, the data stored in the program data storage 400 may be output together with a random data input command when the command controller 220 outputs the random data input command. When the data stored in the program data storage 400 is output to the memory device 100, the memory device 100 may resume the suspended program operation by receiving a resume command.

The memory controller 200 may control overall operations of the storage device 50.

When a power voltage is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory, a logical-physical address mapping table that establishes a mapping relationship between the LBA and the PBA.

The memory controller 200 may control the memory device 100 to perform a program operation, a read operation, an erase operation, or the like in response to a request from the host 300. For example, when a program request is received from the host 300, the memory controller 200 may change the program request into a program command, and provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received together with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the storage device 50 may further include a buffer memory (not shown). The memory controller 200 may control data exchange between the host 300 and the buffer memory. Alternatively, the memory controller 200 may temporarily store system data for controlling the memory device 100 in the buffer memory. For example, the memory controller 200 may temporarily store data input from the host 300 in the buffer memory, and then transmit the data temporarily stored in the buffer memory to the memory device 100.

In various embodiments, the buffer memory may be used as a working memory or cache memory of the memory controller 200. The buffer memory may store codes or commands executed by the memory controller 200. Alternatively, the buffer memory may store data processed by the memory controller 200.

In an embodiment, the buffer memory may be implemented with a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SRAM, a Low Power DDR (LPDDR), or a Rambus Dynamic Random Access Memory (RDRAM), or a Static Random Access Memory (SRAM).

In various embodiments, the buffer memory may be coupled to the storage device 50 at the outside of the storage device 50. Therefore, volatile memory devices coupled to the storage device 50 at the outside of the storage device 50 may perform functions of the buffer memory.

In an embodiment, the memory controller 200 may control at least two memory devices. The memory controller 200 may control the memory devices according to an interleaving scheme so as to improve operational performance.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
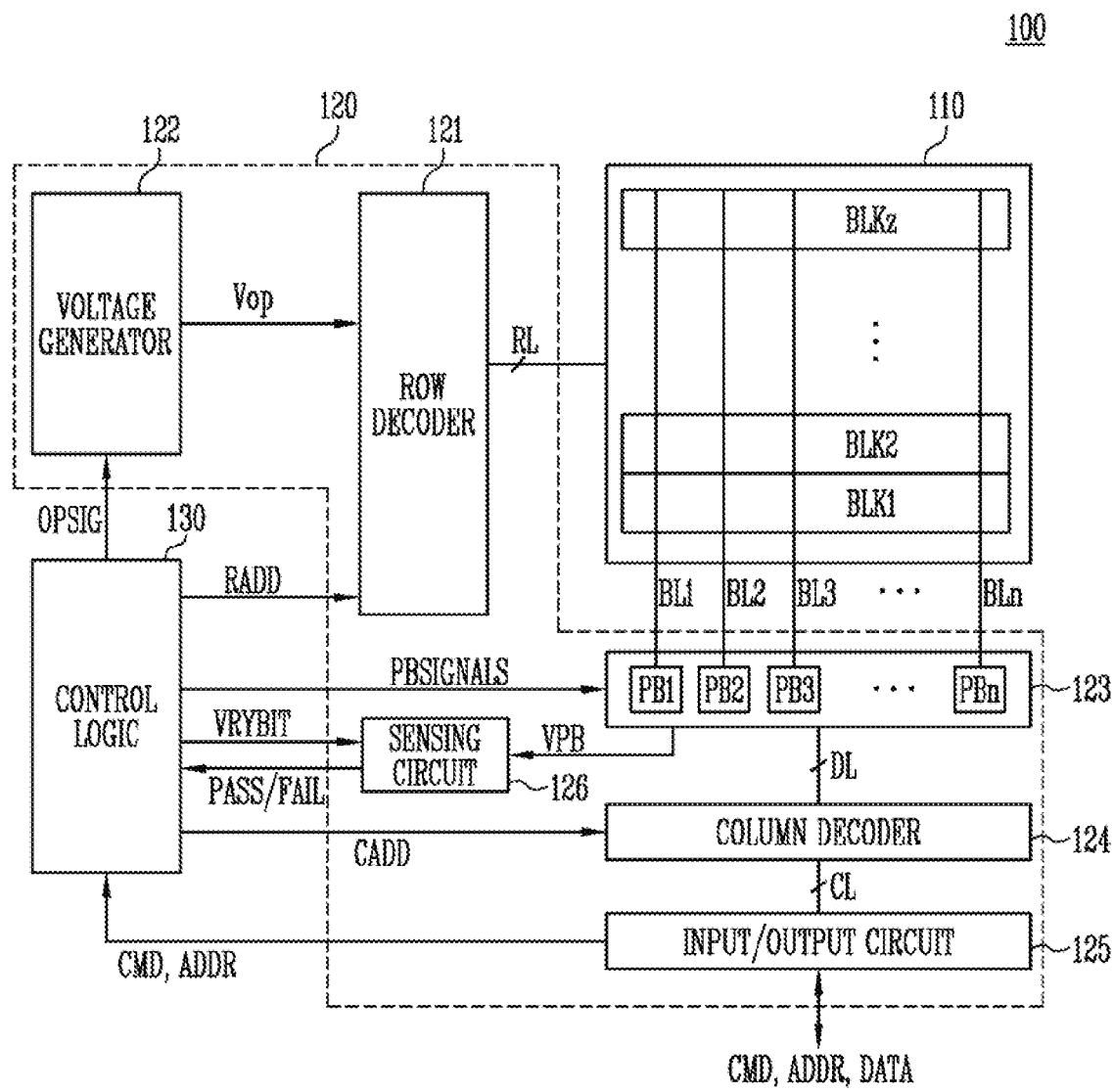
FIG. 2 is a diagram illustrating a structure of a memory device shown in FIG. 1.

FIG. 2 is a diagram illustrating a structure of the memory device shown in FIG. 1.

Referring to FIG. 2, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as a page. Therefore, one memory block may include a plurality of pages.

The row lines RL may include at least one source select line, a plurality of word lines, and at least one drain select line.

Each of the memory cells included in the memory cell array 110 may be configured as a Single-Level Cell (SLC) storing one data bit, a Multi-Level Cell (MLC) storing two data bits, a Triple-Level Cell (TLC) storing three data bits, or a Quadruple-Level Cell (QLC) storing four data bits.

The peripheral circuit 120 may perform a program operation, a read operation, or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130. The control logic 130 may be implemented as hardware, software, or a combination of hardware and software. For example, the control logic 130 may be a control logic circuit operating in accordance with an algorithm and/or a processor executing control logic code.

The peripheral circuit 120 may include the row decoder 121, the voltage generator 122, the page buffer group 123, a column decoder 124, an input/output circuit 125, and a sensing circuit 126.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a voltage level lower than the program voltage to unselected word lines. In a program verify operation, the row decoder 121 may apply a verify voltage to the selected word line, and apply a verify pass voltage having a voltage level higher than the verify voltage to the unselected word lines.

In a read operation, the row decoder 121 may apply a read voltage to the selected word line, and apply a read pass voltage having a voltage level higher than the read voltage to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erase voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn. The first to nth page buffers PB1 to PBn are coupled to the memory cell array 110 respectively through first to nth bit lines BL1 to BLn. The first to nth bit lines BL1 to BLn operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense voltages or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing voltages or currents received from the selected memory cells through the first to nth bit lines BL1 to BLn.

In a read operation, the first to nth page buffers PB1 to PBn read data DATA from the memory cells of the selected page through the first to nth bit lines BL1 to BLn, and output the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller (200 shown in FIG. 1), to the control logic 130, or exchange data DATA with the column decoder 124.

In a read operation or verify operation, the sensing circuit 126 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. For example, the control logic 130 may control a read operation of a selected memory block in response to a sub-block read command and an address. Also, the control logic 130 may control an erase operation a selected sub-block included in the selected memory block in response to a sub-block erase command and an address. Also, the control logic 130 may determine whether the verify operation has passed or failed in response to the pass or fail signal PASS or FAIL.

Each of the memory cells included in the memory cell array 110 may be programmed to any one program state among a plurality of program states according to data stored therein. A target program state of a memory cell may be determined as any one of the plurality of program states according to data stored in the memory cell.

Figure 3:
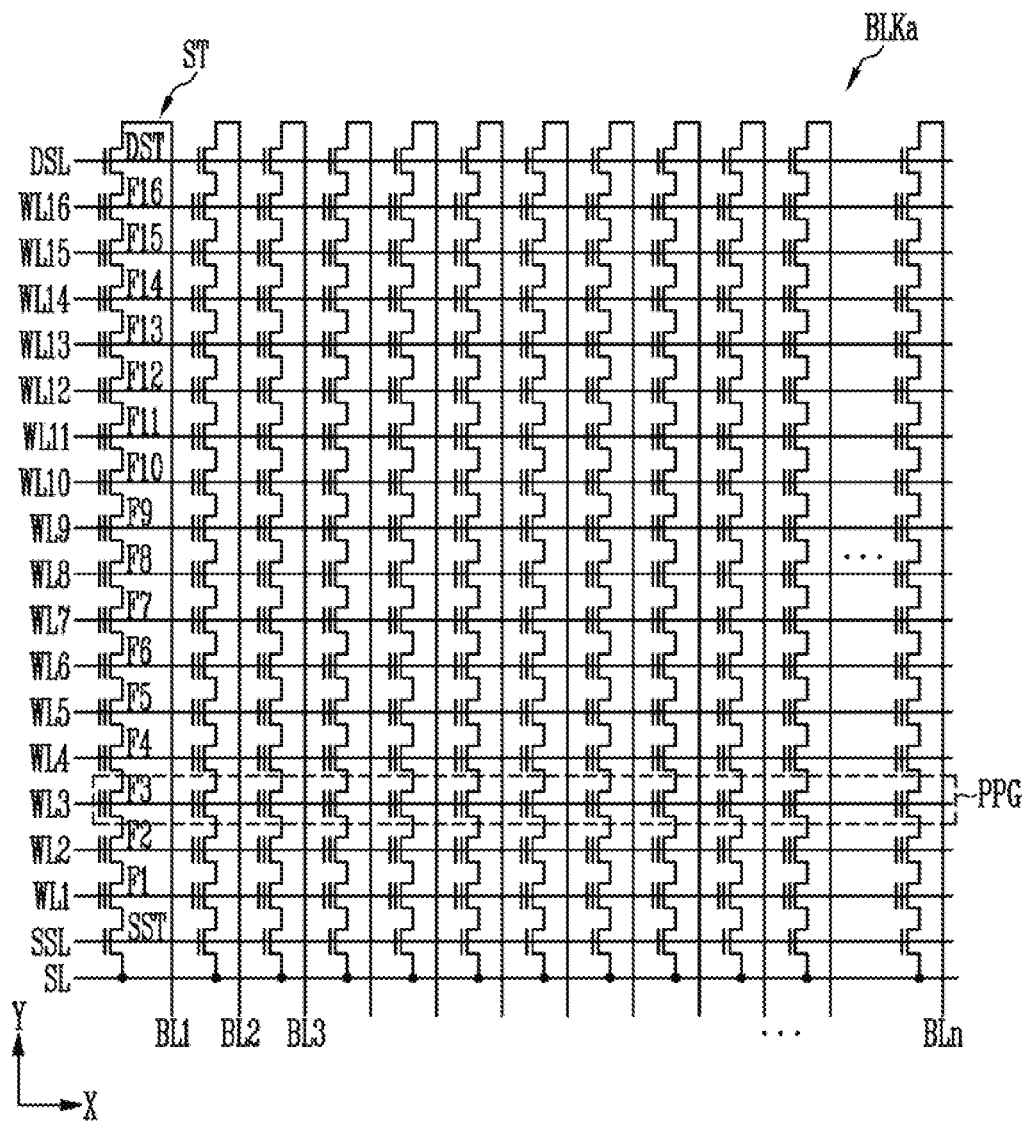
FIG. 3 is a diagram illustrating a memory block.

FIG. 3 is a diagram illustrating a memory block.

Referring to FIGS. 2 and 3, FIG. 3 is a circuit diagram illustrating any one memory block BLKa among the plurality of memory blocks BLK1 to BLKz included in the memory cell array 110 shown in FIG. 2.

In the memory block BLKa, a first select line, word lines, and a second select line, which are arranged in parallel with each other, may be coupled to memory cells. For example, the word lines may be arranged in parallel between the first and second select lines. The first select line may be a source select line SSL, and the second select line may be a drain select line DSL.

More specifically, the memory block BLKa may include a plurality of strings coupled between bit lines BL1 to BLn and a source line SL. The bit lines BL1 to BLn may be respectively coupled to the strings, and the source line SL may be commonly coupled to the strings. The strings may be configured identically to one another, and therefore, a string ST coupled to a first bit line BL1 is described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings may be coupled to the source select line SSL, and gates of drain select transistors DST included in different strings may be coupled to the drain select line DSL. Gates of the memory cells F1 to F16 may be coupled to a plurality of word lines WL1 to WL16. A group of memory cells coupled to the same word line among memory cells included in different strings may be referred to as a physical page PPG. Therefore, physical pages corresponding to the number of the word lines WL1 to WL16 may be included in the memory block BLKa.

One memory cell may store data of one bit. The memory cell is generally referred to as a single-level cell (SLC). One physical page PG may store one logical page (LPG) data. The one LPG data may include data bits of which number corresponds to that of cells included in one physical page PPG. Alternately, one memory cell MC may store data of two or more bits. The memory cell is generally referred to as a multi-level cell (MLC). One physical page PPG may store two or more LPG data.

A memory cell for storing data of two or more bits is referred to as the MLC. As the number of bits of data stored in one memory cell increases, the MLC has recently meant as a memory cell for storing data of two bits. A memory cell for storing data of three or more bits is referred to as a triple-level cell (TLC), and a memory cell for storing data of four or more bits is referred to as a quadruple-level cell (QLC). Besides, memory cells for storing data of a plurality of bits have been developed, and this embodiment may be applied to memory systems in which data of two or more bits are stored.

In another embodiment, each of the plurality of memory blocks may have a three-dimensional structure. Each memory block may include a plurality of memory cells stacked on a substrate. The plurality of memory cells may be arranged along +X, +Y, and +Z directions.

Figure 4:
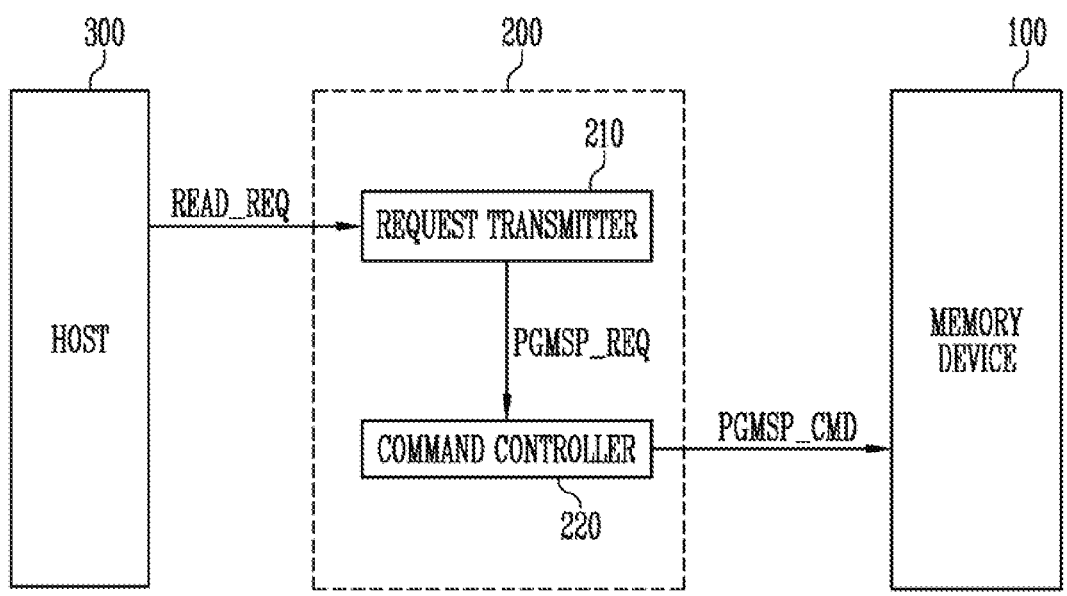
FIG. 4 is a diagram illustrating suspension of a program operation according to a program suspend command.

FIG. 4 is a diagram illustrating the suspension of a program operation according to a program suspend command.

Referring to FIG. 4, the memory controller 200 shown in FIG. 4 may include the request transmitter 210 and the command controller 220. In FIG. 4, there is assumed a case where the program data storage 400 shown in FIG. 1 is omitted.

FIG. 4 illustrates a case where the memory controller 200 receives a read request READ_REQ from the host 300 while the memory device 100 is performing a program operation.

Specifically, the memory controller 200 may output a program command corresponding to a program request from the host 300 to the memory device 100, and the memory device 100 may perform an operation corresponding to the program command received from the memory controller 200.

In an embodiment, the memory controller 200 may receive a read request READ_REQ from the host 300 while the memory device 100 is performing a program operation. Therefore, the memory device 100 may suspend the program operation. Specifically, a time required to perform a read operation is longer than a time required for the memory device 100 to perform the program operation, and hence the memory device 100 may suspend the program operation being performed and preferentially perform the read operation.

In an embodiment, the request transmitter 210 may receive a read request READ REQ from the host 300 while the memory device 100 is performing a program operation. The read request READ_REQ may be a request for reading data stored in the memory device 100.

When the request transmitter 210 receives the read request READ_REQ from the host 300, the request transmitter 210 may determine whether a program suspend request PGMSP_REQ is to be transmitted, by comparing a time required until the program operation being performed by the memory device 100 is completed with a time required to perform a read operation corresponding to the read request READ_REQ.

For example, when the time required to perform the read operation corresponding to the read request READ_REQ is longer than the time required until the program operation being performed by the memory device 100 is completed, the memory device 100 may suspend the program operation. That is, the read operation having a long latency may be preferentially performed. Therefore, the request transmitter 210 may transmit the program suspend request PGMSP_REQ to the command controller 220 so as to suspend the program operation being performed by the memory device 100.

However, when the time required for the memory device 100 to perform the read operation is shorter than the time required until the program operation is completed, the memory device 100 might not suspend the program operation. That is, because the program operation has a latency longer than a latency of the read operation, the program operation being performed by the memory device 100 might not be suspended. Therefore, the request transmitter 210 might not transmit the program suspend request PGMSP_REQ to the command controller 220, but may transmit the read request READ_REQ received from the host 300 to the command controller 220.

In FIG. 4, there is assumed a case where the latency of the read operation is longer than the latency of the program operation.

Therefore, when the request transmitter 210 receives the read request READ_REQ from the host 300 while the memory device 100 is performing the program operation, the request transmitter 210 may output the program suspend request PGMSP_REQ for suspending the program operation to the command controller 220.

In an embodiment, the command controller 220 may receive a request from the request transmitter 210. That is, the command controller 220 may receive the request received from the host 300 through the request transmitter 210. The command controller 220 may generate a command corresponding to the request received from the request transmitter 210, and output the generated command to the memory device 100. The command controller 220 may manage the generated command through a command queue. That is, the command controller 220 may generate a command and then queue the generated command in the command queue, and output the command queued in the command queue to the memory device 100, based on a latency of an operation being performed by the memory device 100.

When the command controller 220 receives a program suspend request PGMSP_REQ from the request transmitter 210, the command controller 220 may output a program suspend command PGMSP_CMD corresponding to the program suspend request PGMSP_REQ to the memory device 100. When the memory device 100 receives the program suspend command PGMSP_CMD, the memory device 100 may suspend the program operation and perform an operation corresponding to a command received subsequently.

Figures 5A, 5B:
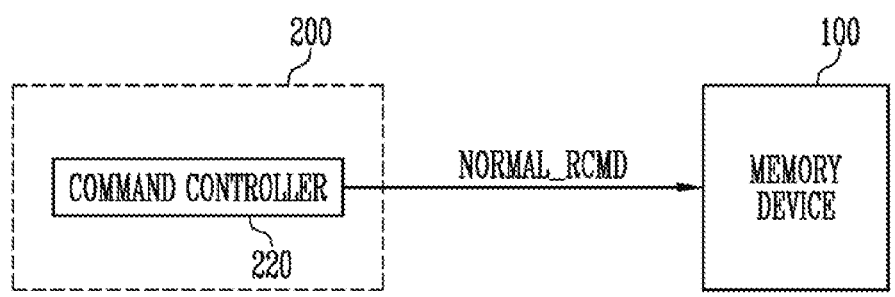
FIGS. 5A and 5B are diagrams illustrating a process in which a normal read command is output based on a number of read commands queued in a command queue.

FIGS. 5A and 5B are diagrams illustrating a process in which a normal read command is output based on a number of read commands queued in a command queue.

Referring to FIGS. 4, 5A, and 5B, FIG. 5A illustrates a command queue included in the command controller 220, and FIG. 5B illustrates a normal read command NOR- MAL_RCMD output based on a number of commands queued in the command queue. FIGS. 5A and 5B illustrate an operation of the command controller 220 after the command controller 220 outputs the program suspend command to the memory device 100 in FIG. 4.

In FIG. 5B, there is assumed a case where the other components except the command controller 220 in the configuration of the memory controller 200 shown in FIG. 1 are omitted.

In an embodiment, the command controller 220 may receive a request received from the host (300 shown in FIG. 1) through the request transmitter 210, and generate a command corresponding to the request received from the host (300 shown in FIG. 1) and then queue the generated command in the command queue. FIG. 5A illustrates commands queued in the command queue. In an embodiment, the commands queued in the command queue may be first to ninth read commands READ_CMD1 to READ_CMD9.

When a number of the read commands queued in the command queue is smaller than a first reference value, the command controller 220 may output, to the memory device 100, a normal read command NORMAL_RCMD for allowing the memory device 100 to perform a normal read operation. The first reference value may be predetermined.

In an embodiment, the first reference value may be a number of read commands, where a time required until data stored in a page buffer of the memory device 100 is output to the memory controller 200 to be stored in the memory controller 200 and the data stored in the memory controller 200 is again stored in the page buffer of the memory device 100 becomes equal to a time required to execute read commands accumulated in the command queue. That is, it may be determined whether a normal read operation or cache read operation is to be performed, based on a number of read commands to be executed by the memory device 100. The normal read operation is an operation distinguished from the cache read operation, and may be a read operation using no cache latch.

In FIGS. 5A and 5B, a case where the first reference value is "10" is assumed.

In an embodiment, when the number of the read commands queued in the command queue is smaller than 10 as the first reference value, it is unnecessary to perform the cache read operation.

That is, because a limited number of latches are included in the page buffer of the memory device 100, it is necessary to move data stored in a latch and secure a latch for the cache read operation so as to perform the cache read operation. However, when the number of the commands queued in the command queue is smaller than the first reference value, it is inefficient to move data stored in a latch and then perform a read operation. Hence, it is necessary to store the data stored in the latch in another memory cell or to output the data stored in the latch to the memory controller 200.

Consequently, because the number of the read commands queued in the command queue is smaller than 10 in FIGS. 5A and 5B, the command controller 220 may output, to the memory device 100, the normal read command NORMAL_RCMD for performing the normal read operation using no cache latch. The memory device 100 may perform operations corresponding to the first to ninth read commands READ_CMD1 to READ_CMD9 by receiving the normal read command NORMAL_RCMD.

After the memory device 100 performs all the operations corresponding to the first to ninth read commands READ_CMD1 to READ_CMD9, the memory controller 200 may output a resume command to the memory device 100. The memory device 100 may again perform the suspended program operation by receiving the resume command.

FIGS. 6A and 6B are diagrams illustrating a process in which a cache read command is output based on a number of read commands queued in a command queue.

Referring to FIGS. 4, 6A, and 6B, FIG. 6A illustrates a command queue included in the command controller 220, and FIG. 6B illustrates an operation for outputting a cache read command CACHE_RCMD, based on a number of commands queued in the command queue. FIGS. 6A and 6B illustrate an operation of the command controller 220 after the command controller 220 outputs the program suspend command to the memory device 100 in FIG. 4.

In FIG. 6A, read commands corresponding to a request received from the host 300 may be queued in the command queue, while the memory device 100 is performing a program operation. That is, the memory controller 200 may receive first to tenth read requests from the host 300 while the memory device 100 is performing the program operation, and first to tenth read commands READ_CMD1 to READ_CMD10 corresponding to the first to tenth read request may be queued in the command queue.

Unlike the number of the commands queued in the command queue illustrated in FIG. 5A, a number of the commands queued in the command queue illustrated in FIG. 6A may be 10 as the first reference value. That is, FIG. 6B illustrates operations of the memory controller 200 and the memory device 100 when the number of the commands queued in the command queue is equal to or greater than the first reference value.

In an embodiment, when the number of the read commands queued in the command queue is equal to or greater than the first reference value, the command controller 220 may output a cache read command CACHE_RCMD to the memory device 100. However, data to be programmed in a memory cell is yet stored in a latch because the program operation being performed by the memory device 100 is suspended, and hence it is necessary to secure a latch for performing a cache read operation. Therefore, the command controller 220 may output a random data output command RDOUT_CMD to the memory device 100 so as to secure the latch for performing the cache read operation.

Referring to FIG. 6B, after the command controller 220 determines to output the cache read command CACHE_RCMD, the command controller 220 may output a random data output command RDOUT_CMD for securing a cache latch to the memory device 100. The memory device 100 may output data stored in any one of a plurality of latches to the memory controller 200 in response to the random data output command RDOUT_CMD.

For example, when the memory device 100 performs a program operation by using a Triple-Level Cell (TLC) scheme, program data may be temporarily stored in three latches among a plurality of latches included in a page buffer and then programmed in a memory cell. That is, LSB page data LSB_DATA, CSB page data CSB_DATA, and MSB page data MSB_DATA may be temporarily stored in the respective latches and then programmed in the memory cell.

Data stored in any one latch among the three latches may be output to the memory controller 200 such that the cache read operation is performed by the memory device 100. That is, any one data among the LSB page data LSB_DATA, the CSB page data CSB_DATA, and the MSB page data MSB_DATA may be output to the memory controller 200, and the latch in which the data output to the memory controller 200 has been stored may be used as the latch for performing the cache read operation.

An operation corresponding to the random data output command RDOUT_CMD may be identically applied even when the program operation is performed using a Multi-Level Cell (MLC) scheme or a Quadruple-Level Cell (QLC) scheme. That is, after data stored in any one of latches in which a plurality of page data are stored is output to the memory controller 200, the corresponding latch may be used as the latch for performing the cache read operation.

In an embodiment, any one data among the LSB page data LSB_DATA, the CSB page data CSB_DATA, and the MSB page data MSB_DATA may be stored in the program data storage 400. The program data storage 400 may be configured as a Static Random Access Memory (SRAM) or a Dynamic Random Access Memory (DRAM).

When the memory device 100 ends the cache read operation and again performs the program operation after the program data storage 400 stores data output from the memory device 100, the program data storage 400 may again output the data output from the memory device 100 to the memory device 100.

When the data received from the memory device 100 is stored in the program data storage 400, the command controller 220 may output a cache read command CACHE_RCMD for performing the cache read operation to the memory device 100. The memory device 100 may perform the cache read operation in response to the cache read command CACHE_RCMD.

Figure 7:
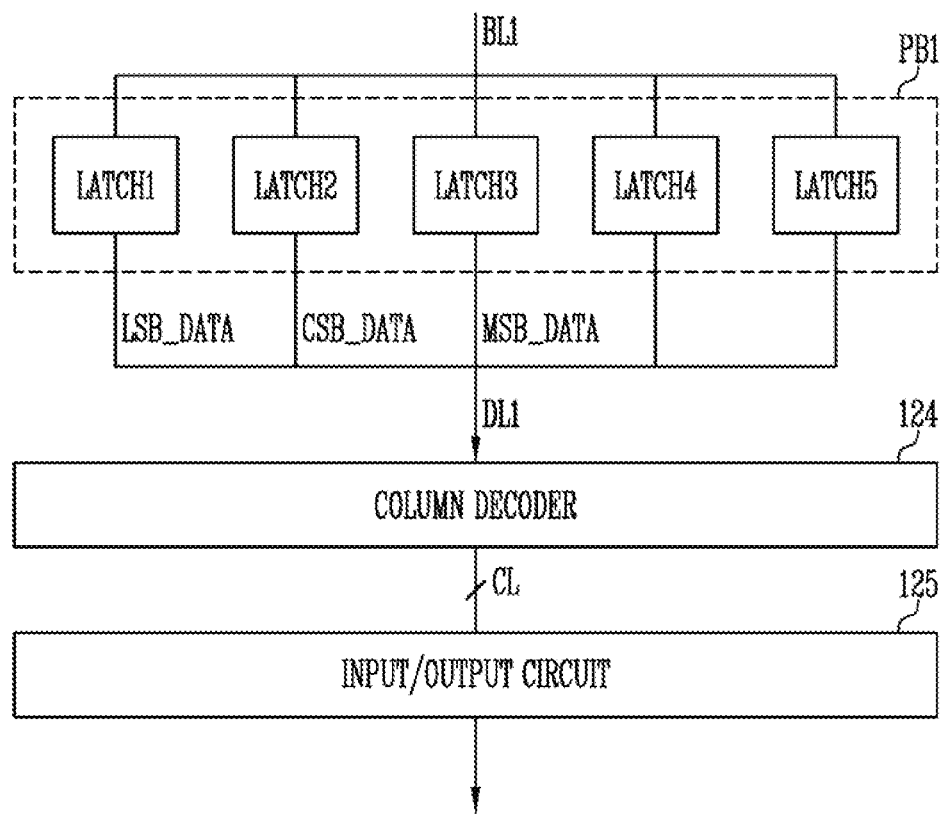
FIG. 7 is a diagram illustrating a process in which data is output in the memory device shown in FIG. 6.

FIG. 7 is a diagram illustrating a process in which data is output in the memory device 100 shown in FIG. 6B.

Referring to FIG. 7, FIG. 7 illustrates a first page buffer PB1 included in the page buffer group (123 shown in FIG. 2), a column decoder 124, and the input/output circuit 125 in the configuration of the memory device 100 shown in FIG. 2. In FIG. 7, there is assumed a case where the other components in the configuration of the memory device 100 shown in FIG. 2 are omitted. FIG. 7 illustrates data output when the memory device 100 performs a program operation by using a Triple-Level Cell (TLC) scheme.

In an embodiment, the first page buffer PB1 included in the page buffer group (123 shown in FIG. 2) may include first to fifth latches LATCH1 to LATCH5. The first to fifth latches LATCH1 to LATCH5 may be commonly coupled to the first bit line BL1. Also, the first to fifth latches LATCH1 to LATCH5 may be coupled to the column decoder 124 through a first data line DL1. Each of the other buffers included in the page buffer group (123 shown in FIG. 2) may also be coupled to a corresponding bit line and a corresponding data line.

LSB page data LSB_DATA, CSB page data CSB_DATA, and MSB page data MSB_DATA may be temporarily stored respectively in the first to third latches LATCH1 to LATCH3 among the first to fifth latches LATCH1 to LATCH5 included in the first page buffer PB1, and the data stored in the first to third latches LATCH1 to LATCH3 may be programmed in a memory cell. The fourth and fifth latches LATCH4 and LATCH5 among the first to fifth latches LATCH1 to LATCH5 included in the first page buffer PB1 may be used in a sensing operation for sensing data stored in the memory cell.

In an embodiment, when the command controller 220 outputs a random data output command to the memory device 100, the memory device 100 may perform an operation corresponding to the random data output command.

Specifically, when the memory device 100 receives the random data output command, the memory device 100 may transmit any one data among the data stored in the first to third latches LATCH1 to LATCH3 to the column decoder 124 through the first data line DL1. That is, any one data among the LSB page data LSB_DATA stored in the first latch LATCH1, the CSB page data CSB_DATA stored in the second latch LATCH2, and the MSB page data MSB_DATA stored in the third latch LATCH3 may be transmitted to the column decoder 124 through the first data line DL1.

Data transmitted to the column decoder 124 may be transmitted to the input/output circuit 125 through a column line, and the data transmitted to the input/output circuit 125 may be provided to the memory controller 200.

When any one data among the data stored in the first to third latches LATCH1 to LATCH3 is transmitted to the memory controller 200, a latch transmitting the data may be allocated as a latch for performing a cache read operation. That is, the latch that transmits data to the memory controller may be erased, and may store the read data in the cache read operation.

Figure 8:
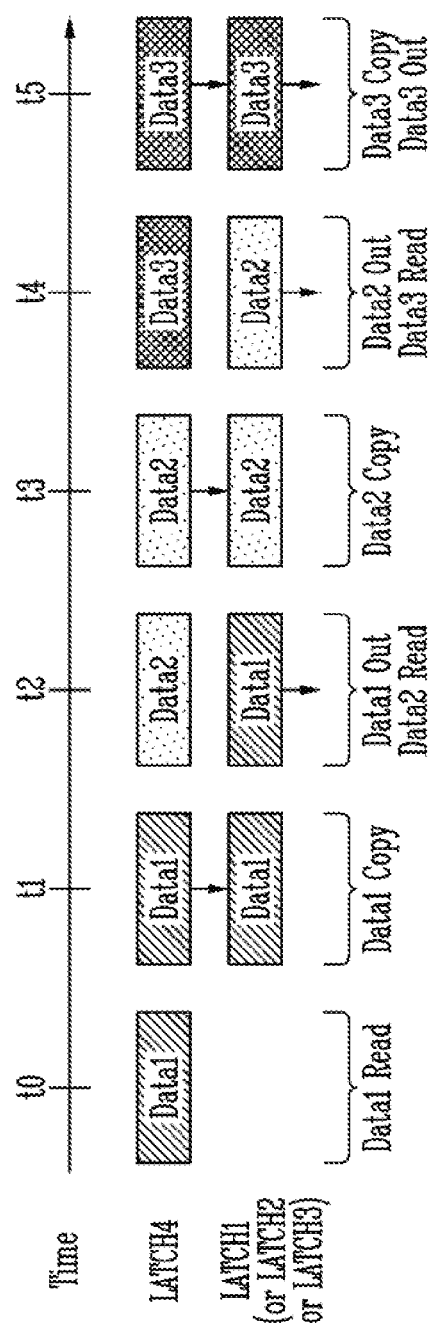
FIG. 8 is a diagram illustrating a transmission operation of a latch corresponding to a cache read command shown in FIG. 6.

FIG. 8 is a diagram illustrating a transmission operation of a latch corresponding to the cache read command shown in FIG. 6.

Referring to FIG. 8, FIG. 8 is a diagram illustrating some latches used to perform a cache read operation among the plurality of latches included in the first page buffer (PB1 shown in FIG. 7). The memory device (100 shown in FIG. 1) may read data stored in a memory cell at times t0 to t5.

In an embodiment, in a normal read operation that is a general read operation, the read operation may be performed using the fourth and fifth latches LATCH4 and LATCH5 included in the first page buffer (PB1 shown in FIG. 7). That is, data stored in the memory cell may be temporarily stored in the fourth latch LATCH4, and data for sensing may be stored in the fifth latch LATCH5.

However, unlike the normal read operation, in a cache read operation, the cache read operation may be performed using any one latch among the first to third latches LATCH1 to LATCH3 in addition to the fourth and fifth latches LATCH4 and LATCH5 included in the first page buffer (PB1 shown in FIG. 7). That is, a latch outputting data in response to the random data output command received from the memory controller (200 shown in FIG. 1) may be used to perform the cache read operation.

For example, in the cache read operation, data stored in the memory cell may be stored in the fourth latch LATCH4. The data stored in the fourth latch LATCH4 may be stored in the first latch LATCH1. That is, when LSB page data LSB_DATA stored in the first latch LATCH1 is output to the memory controller (200 shown in FIG. 1) in response to the random data output command, the first latch LATCH1 may be allocated as a latch for performing the cache read operation, and the data stored in the fourth latch LATCH4 may be stored in the first latch LATCH1.

In an embodiment, when CSB page data CSB_DATA stored in the second latch LATCH2 is output to the memory controller (200 shown in FIG. 1), the second latch LATCH2 may be allocated as a latch for performing the cache read operation, and the data stored in the fourth latch LATCH4 may be stored in the second latch LATCH2. In addition, when MSB page data MSB_DATA stored in the third latch LATCH3 is output to the memory controller (200 shown in FIG. 1), the third latch LATCH3 may be allocated as a latch for performing the cache read operation, and the data stored in the fourth latch LATCH4 may be stored in the third latch LATCH3.

Consequently, the data stored in the first latch LATCH1, the second latch LATCH2, or the third latch LATCH3 may be output to the memory controller (200 shown in FIG. 1). In the cache read operation, the fourth latch LATCH4 operates as a main latch and the first latch LATCH1, the second latch LATCH2, or the third latch LATCH3, which is allocated as a cache latch, may perform independent operations.

Therefore, while the data read from the memory cell is being stored in the fourth latch LATCH4, the data stored in the first latch LATCH1, the second latch LATCH2, or the third latch LATCH3 may be output to the column decoder. The cache read operation performed in the present disclosure may be performed in the following time sequence.

At time t0, the memory device (100 shown in FIG. 1) may store first data Data1 among the data stored in the memory cell to the fourth latch LATCH4 (Data1 Read).

At time t1, the memory device (100 shown in FIG. 1) may copy the first data Data1 stored in the fourth latch LATCH4 to the first latch LATCH1, the second latch LATCH2 or the third latch LATCH3 (Data1 Copy).

At time t2, while the memory device (100 shown in FIG. 1) is storing second data Data2 in the fourth latch LATCH4 (Data2 Read), the memory device (100 shown in FIG. 1) may output the first data Data1 stored in the first latch LATCH1, the second latch LATCH2 or the third latch LATCH3 to the memory controller (200 shown in FIG. 1) (Data1 Out).

At time t3, the memory device (100 shown in FIG. 1) may copy the second data Data2 stored in the fourth latch LATCH4 to the first latch LATCH1, the second latch LATCH2 or the third latch LATCH3 (Data2 Copy).

At time t4, while the memory device (100 shown in FIG. 1) is storing third data Data3 in the fourth latch LATCH4 (Data3 Read), the memory device (100 shown in FIG. 1) may output the second data Data2 stored in the first latch LATCH1, the second latch LATCH2 or the third latch LATCH3 to the memory controller (200 shown in FIG. 1) (Data2 Out).

At time t5, the memory device (100 shown in FIG. 1) may copy the third data Data3 stored in the fourth latch LATCH4 to the first latch LATCH1, the second latch LATCH2 or the third latch LATCH3 (Data3 Copy), and then output the third data Data3 stored in the first latch LATCH1, the second latch LATCH2 or the third latch LATCH3 to the memory controller (200 shown in FIG. 1) (Data3 Out).

At times t2, t4, and t5, while the data stored in the memory cell is being read to the fourth latch LATCH4, the data stored in the first latch LATCH1, the second latch LATCH2 or the third latch LATCH3 may be output. Thus, when a sequential read operation is performed using a cache read scheme, the memory device (100 shown in FIG. 1) can perform the sequential read operation more rapidly and effectively than the normal read operation that does not use the cache read scheme.

Figure 9:
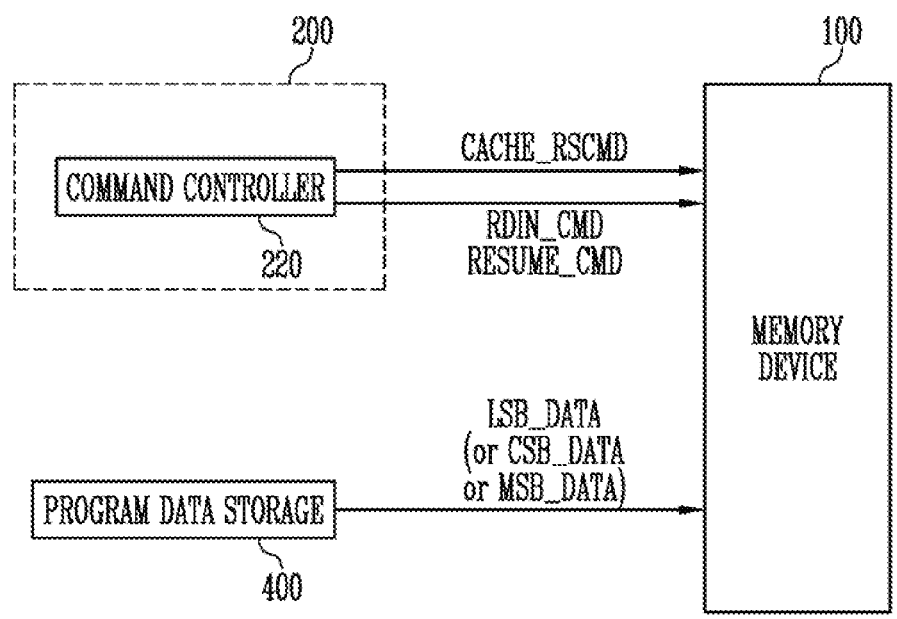
FIG. 9 is a diagram illustrating suspension of a cache read operation and resume of a program operation.

FIG. 9 is a diagram illustrating suspension of a cache read operation and resume of a program operation.

Referring to FIG. 9, the memory controller 200 shown in FIG. 9 may include the command controller 220 and the program data storage 400. In FIG. 9, there is assumed a case where the request transmitter (210 shown in FIG. 1) in the configuration of the memory controller (200 shown in FIG. 1) is omitted.

FIG. 9 illustrates a case where an operation corresponding to the cache read command output from the command controller 220 is suspended.

In an embodiment, the memory device 100 may perform a cache read operation corresponding to the cache read command. When a number of read commands executed by the memory device 100 is greater than a second reference value, the memory device 100 may suspend the cache read operation. The second reference value may be predetermined.

Specifically, the memory device 100 may perform a cache read operation corresponding to the cache read command received from the command controller 220, in a program suspend state. However, a read command may be queued in the command queue even while the memory device 100 is performing the cache read operation, and hence it may be necessary to suspend the cache read operation such that the memory device 100 performs a suspended program operation.

That is, for an embodiment, when a read command is continuously queued in the command queue, the memory device 100 cannot again perform the suspended program operation. Therefore, the memory device 100 may suspend the cache read operation to again perform the suspended program operation.

In the present disclosure, the command controller 220 may control the memory device 100 to suspend the cache read operation, based on whether the number of read commands executed by the memory device exceeds the second reference value.

For example, when the number of read commands executed by the memory device exceeds 20, the command controller 220 may output a cache read suspend command CACHE_RSCMD to the memory device 100. The second reference value may be "20." The memory device 100 may suspend the cache read operation by receiving the cache read suspend command CACHE_RSCMD.

When the cache read operation is suspended, the command controller 220 may output a random data input command RDIN_CMD to the memory device 100 so as to again perform the suspended program operation. After the command controller 220 outputs the random data input command RDIN_CMD to the memory device 100, the program data storage 400 may again output, to the memory device 100, data output from the memory device 100 before the memory device 100 performs the cache read operation. The data output from the memory device 100 may be any one of LSB page data LSB_DATA, CSB page data CSB_DATA, and MSB page data MSB_DATA.

When any one of the LSB page data LSB_DATA, the CSB page data CSB_DATA, and the MSB page data MSB_DATA is output to the memory device 100, the output data may be stored in a latch. Data subsequently stored in the latch may be used to perform the suspended program operation.

When the data output to the memory device 100 is stored in the latch, the command controller 220 may output a resume command RESUME_CMD to the memory device 100. The memory device 100 may resume the suspended program operation by receiving the resume command RESUME_CMD. That is, the data that has been stored in the program data storage 400 may be again stored in the latch, and the memory device 100 may program the data stored in the latch in the memory cells, corresponding to the resume command RESUME_CMD.

Figure 10:
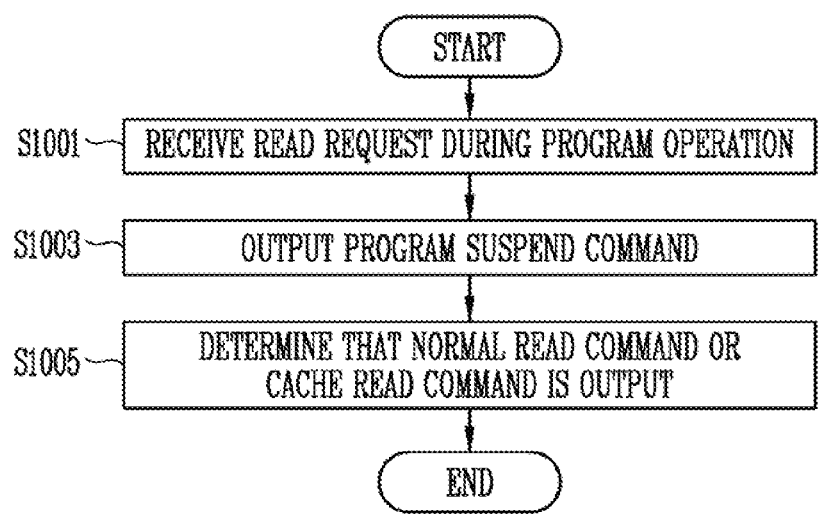
FIG. 10 is a diagram illustrating a process in which a normal read command or cache read command is output in accordance with an embodiment of the present disclosure.

FIG. 10 is a diagram illustrating a process in which a normal read command or cache read command is output in accordance with an embodiment of the present disclosure.

Referring to FIG. 10, in operation S1001, the memory controller may receive a read request from the host while the memory device is performing a program operation. The memory controller may generate a read command corresponding to the read request and output the generated read command to the memory device. The memory device may perform a read operation corresponding to the read command.

However, because the memory device is performing the program operation, the memory controller may output a program suspend command to the memory device, based on a latency of the read operation and a latency of the program operation being performed by the memory device (S1003). For example, when a time required to perform the read operation is longer than a time required to complete the program operation, it may be necessary to preferentially perform the read operation. Hence, the memory controller may output the program suspend command for suspending the program operation to the memory device.

After the memory controller outputs the program suspend command, the memory controller may determine whether a normal read command or cache read command is to be output, based on a number of commands queued in a command queue (S1005).

For example, when a number of read commands queued in the command queue is smaller than a first reference value, a time required to read data stored in a page buffer to the memory controller and again transmit the data read to the memory controller to the page buffer is longer than a time required to perform a read command queued in the command queue. Hence, it is unnecessary to perform the cache read operation. Therefore, the memory controller may determine that the normal read command is output to the memory device so as to execute the read commands queued in the command queue.

For a contrary example, when the number of read commands queued in the command queue is greater than or equal to the first reference value, the time required to read the data stored in the page buffer to the memory controller and again transmit the data read to the memory controller to the page buffer is shorter than the time required to perform the read command queued in the command queue. Hence, it may be necessary to perform the cache read operation. Therefore, the memory controller may determine that the cache read command is output to the memory device so as to execute the read commands queued in the command queue.

Figure 11:
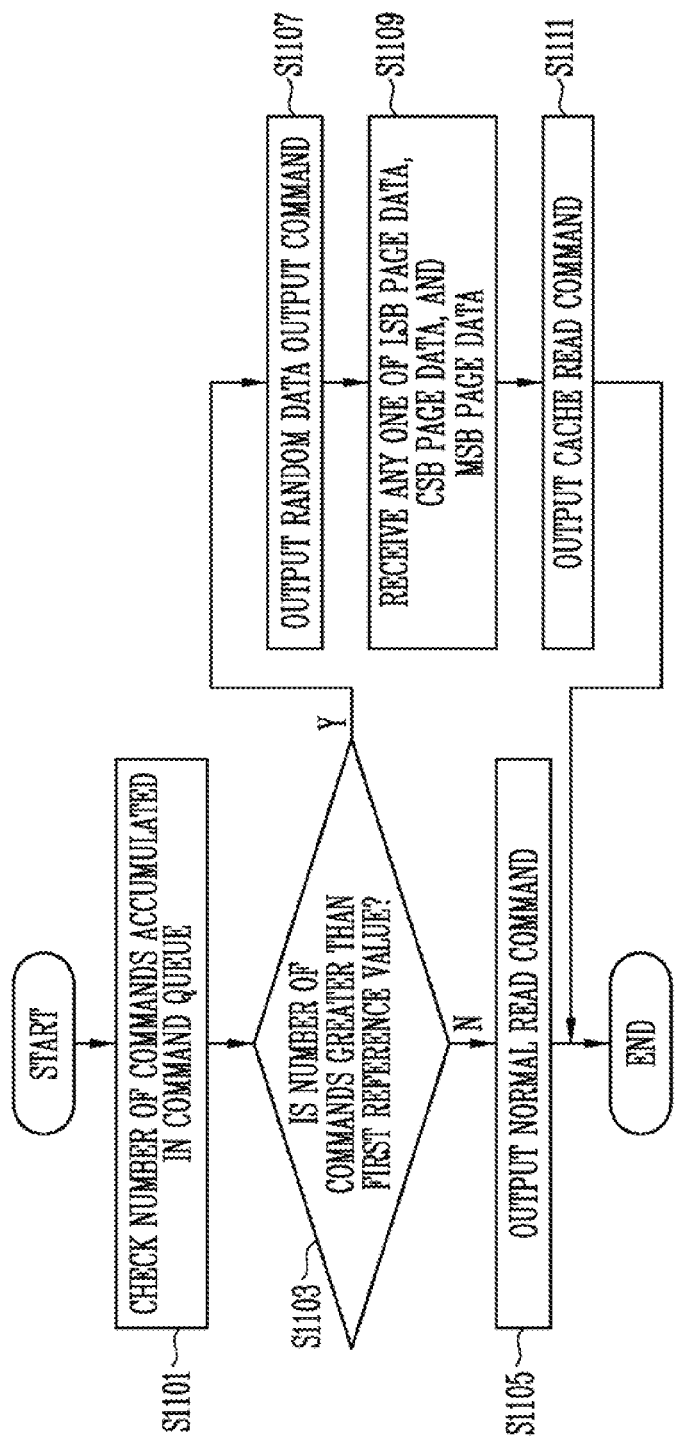
FIG. 11 is a diagram illustrating a normal read command or cache read command, which is output based on a command queue in accordance with an embodiment of the present disclosure.

FIG. 11 is a diagram illustrating a normal read command or cache read command, which is output based on a command queue in accordance with an embodiment of the present disclosure.

FIG. 11 is a flowchart obtained by subdividing the operation S1005 shown in FIG. 10 in accordance with an embodiment of the present disclosure.

In operation S1101, the memory controller may check a number of commands accumulated in the command queue. Commands corresponding to the request received from the host may be queued in the command queue. The commands queued in the command queue may be output to the memory device under the control of the memory controller.

Specifically, the memory controller may determine whether a number of the commands queued in the command queue is greater than the first reference value (S1103). The first reference value may be a number of read commands, where a time required until data stored in a page buffer of the memory device is output to the memory controller to be stored in the memory controller and the data stored in the memory controller is again stored in the page buffer of the memory device becomes equal to a time required to execute read commands accumulated in the command queue.

In an embodiment, when the number of the commands queued in the command queue is smaller than the first reference value (N), the memory controller may output a normal read command to the memory device (S1105). That is, because the time required until the data stored in the page buffer of the memory device is output to the memory controller to be stored in the memory controller and the data stored in the memory controller is again stored in the page buffer of the memory device is longer the time required to execute the read commands accumulated in the command queue, it is unnecessary for the memory device to perform the cache read operation.

On the contrary, when the number of the commands queued in the command queue is greater than the first reference value (Y), the memory controller may output a random data output command to the memory device (S1107). That is, because the time required until the data stored in the page buffer of the memory device is output to the memory controller to be stored in the memory controller and the data stored in the memory controller is again stored in the page buffer of the memory device is shorter than the time required to execute the read commands accumulated in the command queue, the memory device may determine that the cache read operation is performed. Thus, the memory controller may output the random data output command to the memory device, and data stored in the memory device is output to the memory controller, so that a latch for performing the cache read operation can be secured.

Specifically, the memory controller may receive any one of LSB page data, CSB page data, and MSB page data from the memory device (S1109). That is, when the memory device performs a program operation by using a Triple-Level Cell (TLC) scheme, the memory controller may receive any one of data stored in latches of the memory device so as to secure the latch for performing the cache read operation.

When the memory controller receives any one of the LSB page data, CSB page data, and MSB page data, which is stored in a latch of the memory device, the latch in which the received data has been stored may be allocated as a latch for executing the cache read operation.

When the latch for performing the cache read operation is secured, the memory controller may output a cache read command to the memory device (S1111). When the cache read command is output to the memory device, an operation corresponding to the read command queued in the command queue may be performed by the memory device.

Figure 12:
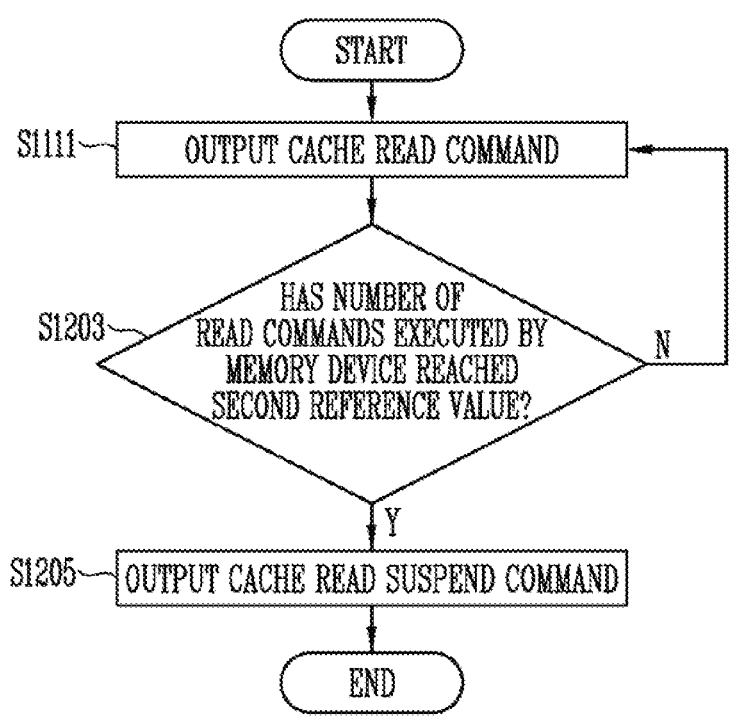
FIG. 12 is a diagram illustrating a process in which a cache read suspend command is output in accordance with an embodiment of the present disclosure.

FIG. 12 is a diagram illustrating a process in which a cache read suspend command is output in accordance with an embodiment of the present disclosure.

Referring to FIGS. 11 and 12, when the latch for executing the cache read operation is secured through the operation S1109 shown in FIG. 11, the memory controller may output the cache read command to the memory device (S1111). The memory device may perform a cache read operation corresponding to the cache read command by receiving the cache read command.

However, when a command is continuously queued in the command queue included in the memory controller, the suspended program operation cannot be again performed. Therefore, the memory controller may determine whether a number of read commands executed by the memory device has reached a second reference value (S1203). The second reference value may be predetermined.

When the number of the read commands executed by the memory device does not reach the second reference value (N), a read operation may be performed by the memory device, and therefore, the memory controller may again output the cache read command to the memory device (S1205).

However, when the number of the read commands executed by the memory device reaches the second reference value (Y), the memory controller may output a cache read suspend command to the memory device. The memory device may suspend the read operation by receiving the cache read suspend command, and perform the suspended program operation.

Figure 13:
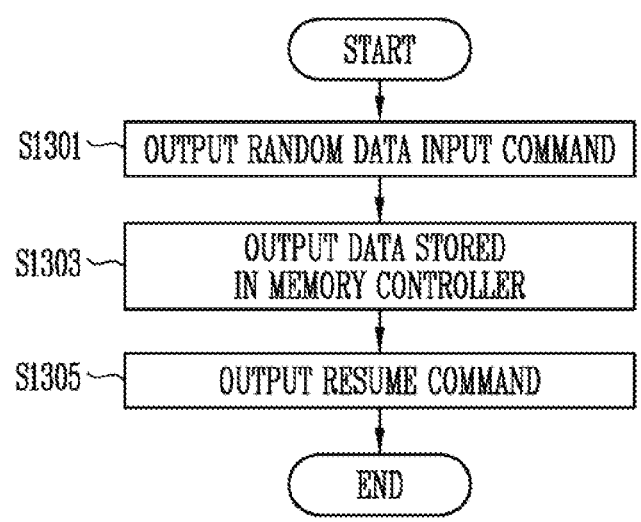
FIG. 13 is a diagram illustrating a process in which a resume command is output in accordance with an embodiment of the present disclosure.

FIG. 13 is a diagram illustrating a process in which a resume command is output in accordance with an embodiment of the present disclosure.

FIG. 13 illustrates operations after the operation S1205 shown in FIG. 12 in accordance with an embodiment of the present disclosure.

In an embodiment, when the memory device suspends the cache read operation, the memory controller may control the memory device to again perform the suspended program operation.

Specifically, the memory controller may output a random data input command to the memory device (S1301). The random data input command may be a command for outputting data received and stored from the memory device to the memory device.

After the memory controller outputs the random data input command to the memory device, data stored in the memory controller may be output to the memory device (S1303). The data stored in the memory controller may be received corresponding to the random data output command before the memory controller outputs the cache read command. When the data stored in the memory controller is output to the memory device, the corresponding data may be stored in the latch used to perform the cache read operation in the memory device.

When the data is stored in the latch of the memory device, the memory controller may output a resume command to the memory device (S1305). The resume command may be a command for again performing the suspended program operation. When the resume command is output to the memory device, the memory device may again perform the suspended program operation, based on the data stored in the latch.

Figure 14:
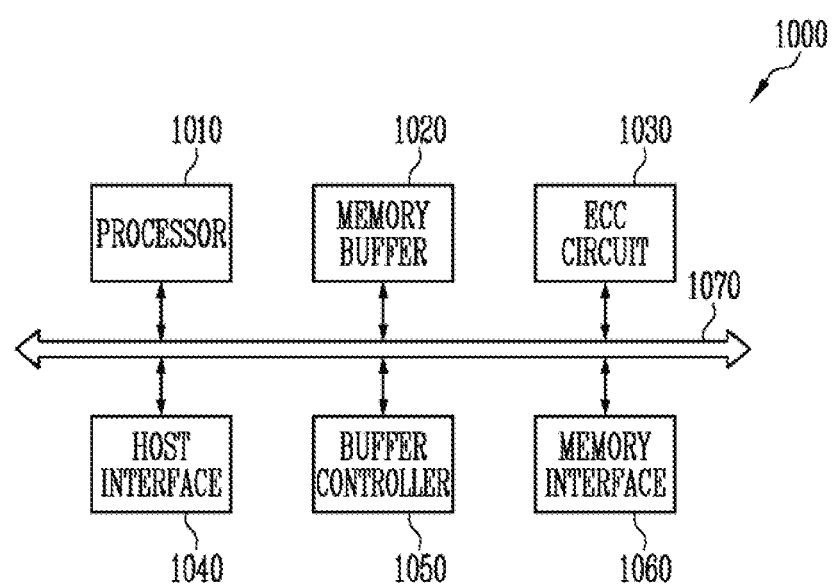
FIG. 14 is a diagram illustrating another embodiment of a memory controller shown in FIG. 1.

FIG. 14 is a diagram illustrating another embodiment of the memory controller 200 shown in FIG. 1.

Referring to FIG. 14, a memory controller 1000 is connected to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit (also referred to as a buffer controller) 1050, a memory interface 1060, and a bus 1070.

The bus 1070 may be configured to provide channels between components of the memory controller 1000.

The processor 1010 may control overall operations of the memory controller 1000, and perform logical operations. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory, or a buffer memory.

The processor 1010 may perform a function of a flash translation layer (FTL). The processor 1010 may translate a logical block address (LBA) provided by the host into a physical block address (PBA) through the FTL. The FTL may receive an LBA to be translated into a PBA using a mapping table. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data, received from the host, using a randomizing seed. The randomized data is provided as data to be stored to the memory device to be programmed in the memory cell array.

When the processor 1010 receives a read request from the host (300 shown in FIG. 1) while the memory device (100 shown in FIG. 1) is performing a program operation, the processor 1010 may control the memory device (100 shown in FIG. 1) such that the program operation being performed by the memory device (100 shown in FIG. 1) is suspended, based on a latency of a read operation corresponding to the read request and a latency of the program operation.

When the program operation being performed by the memory device (100 shown in FIG. 1) is suspended, the processor 1010 may output a normal read command or cache read command to the memory device (100 shown in FIG. 1), based on a number of read commands queued in a command queue.

Before a cache read operation corresponding to the cache read command is performed by the memory device (100 shown in FIG. 1), data may be output from the memory device (100 shown in FIG. 1). The data output from the memory device (100 shown in FIG. 1) may be stored in the memory buffer 1020. Subsequently, when the memory device (100 shown in FIG. 1) resumes the program operation, the data stored in the memory buffer 1020 may be output to the memory device (100 shown in FIG. 1).

The processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may store data processed by the processor 1010. The memory buffer 1020 may include Static RAM (SRAM) and/or Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 might not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus may be separated from each other, and might not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 15:
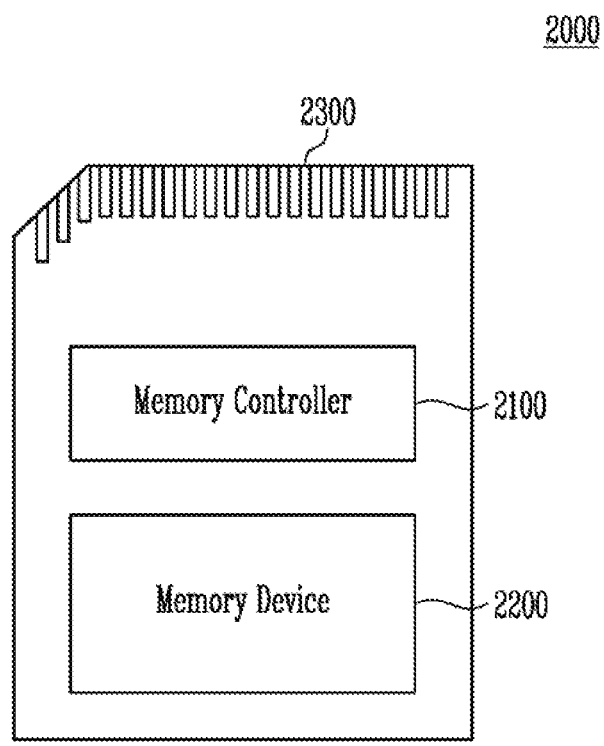
FIG. 15 is a block diagram illustrating a memory card system to which the storage device is applied in accordance with an embodiment of the present disclosure.

FIG. 15 is a block diagram illustrating a memory card system to which the storage device is applied in accordance with an embodiment of the present disclosure.

Referring to FIG. 15, the memory card system 2000 includes a memory controller 2100, a memory device, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory device 2200 may be implemented identically to the memory device 100 described with reference to FIG. 2.

When the memory controller 2100 receives a read request from the host (300 shown in FIG. 1) while the memory device 2200 is performing a program operation, the memory controller 2100 may control the memory device 2200 such that the program operation being performed by the memory device 2200 is suspended, based on a latency of a read operation corresponding to the read request and a latency of the program operation.

When the program operation being performed by the memory device 2200 is suspended, the memory controller 2100 may output a normal read command or cache read command to the memory device 2200, based on a number of read commands queued in a command queue.

Before a cache read operation corresponding to the cache read command is performed by the memory device 2200, data may be output from the memory device 2200. The data output from the memory device 2200 may be stored in the memory controller 2100. Subsequently, when the memory device 2200 resumes the program operation, the data stored in the memory controller 2100 may be output to the memory device 2200.

In an example, the memory controller 2100 may include components such as a Random Access Memory (RAM), a processing unit, a host interface, a memory interface, and the error corrector.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 16:
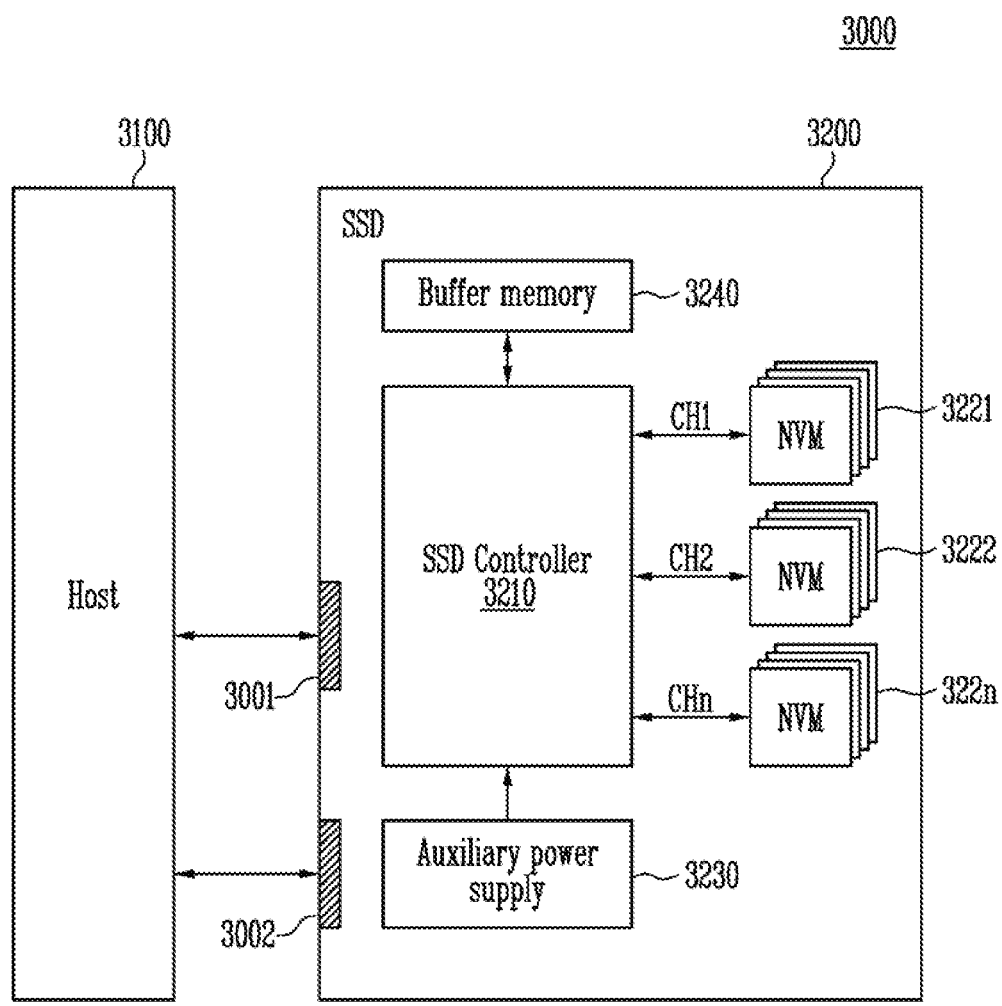
FIG. 16 is a block diagram illustrating a Solid State Drive (SSD) system to which the storage device is applied in accordance with an embodiment of the present disclosure.

FIG. 16 is a block diagram illustrating a Solid State Drive (SSD) system 3000 to which the storage device is applied in accordance with an embodiment of the present disclosure.

Referring to FIG. 16, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

When the SSD controller 3210 receives a read request from the host 3100 while the plurality of flash memories 3221 to 322n are performing a program operation, the SSD controller 3210 may control the plurality of flash memories 3221 to 322n such that the program operation being performed by the plurality of flash memories 3221 to 322n is suspended, based on a latency of a read operation corresponding to the read request and a latency of the program operation.

When the program operation being performed by the plurality of flash memories 3221 to 322n is suspended, the SSD controller 3210 may output a normal read command or cache read command to the plurality of flash memories 3221 to 322n, based on a number of read commands queued in a command queue.

Before a cache read operation corresponding to the cache read command is performed by the plurality of flash memories 3221 to 322n, data may be output from the plurality of flash memories 3221 to 322n. The data output from the plurality of flash memories 3221 to 322n may be stored in the SSD controller 3210. Subsequently, when the plurality of flash memories 3221 to 322n resume the program operation, the data stored in the SSD controller 3210 may be output to the plurality of flash memories 3221 to 322n.

The auxiliary power supply 3230 is connected to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 17:
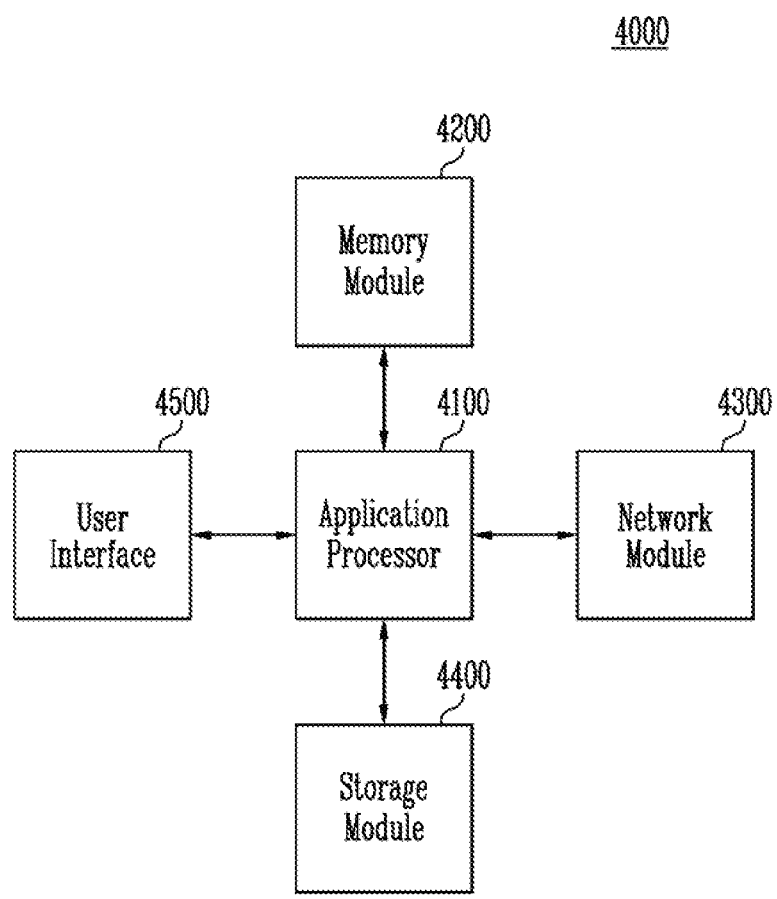
FIG. 17 is a block diagram illustrating a user system to which the storage device is applied in accordance with an embodiment of the present disclosure.

FIG. 17 is a block diagram illustrating a user system 4000 to which the storage device is applied in accordance with an embodiment of the present disclosure.

Referring to FIG. 17, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

When the application processor 4100 receives a read request from the host (300 shown in FIG. 1) while the storage module 4400 is performing a program operation, the application processor 4100 may control the storage module 4400 such that the program operation being performed by the storage module 4400 is suspended, based on a latency of a read operation corresponding to the read request and a latency of the program operation.

When the program operation being performed by the storage module 4400 is suspended, the application processor 4100 may output a normal read command or cache read command to the storage module 4400, based on a number of read commands queued in a command queue.

Before a cache read operation corresponding to the cache read command is performed by the storage module 4400, data may be output from the storage module 4400. The data output from the storage module 4400 may be stored in the application processor 4100. Subsequently, when the storage module 4400 resumes the program operation, the data stored in the application processor 4100 may be output to the storage module 4400.

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIGS. 2 and 3. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, in program suspend, data stored in any one of latches in which program data is stored is output to the memory controller, and the corresponding latch is used as a latch for performing a cache read operation, so that the cache read operation can be performed without adding any latch.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or some of the operations and may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been illustrated in the drawings and described in the specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A storage device comprising:
a memory device for storing data, wherein the memory device includes a page buffer in which data is temporarily stored;
a memory controller for controlling the memory device, wherein the memory controller includes a request transmitter configured to provide a program suspend request for suspending a program operation, when the memory device receives a read request from a host while the memory device is performing the program operation, and
wherein the memory controller includes a command controller configured to generate and output a program suspend command, based on the program suspend request, and output a cache read command or normal read command, based on a number of commands of a command queue in which a command corresponding to the read request received from the host is queued; and
program data storage for communicating with the memory device, wherein the program data storage stores data output from the memory device,
wherein the memory device is configured to output program data stored in any one latch among a plurality of latches included in the page buffer to the program data storage and allocate the latch from which the program data is output as a cache latch for performing a cache read operation corresponding to the cache read command.

2. The storage device of claim 1, wherein the command controller is configured to:
output the cache read command when the number of the commands queued in the command queue is greater than or equal to a first reference value; and
output the normal read command when the number of the commands queued in the command queue is less than the first reference value.

3. The storage device of claim 2, wherein the command controller is configured to, when the number of the commands queued in the command queue is greater than or equal to the first reference value, output a random data output command for receiving the program data, before the command controller outputs the cache read command.

4. The storage device of claim 3, wherein the memory device is configured to output the program data, in response to the random data output command.

5. The storage device of claim 4, wherein the program data storage is configured to receive and store the program data.

6. The storage device of claim 2, wherein the command controller is configured to, when a number of read commands executed by the memory device reaches a second reference value after the command controller outputs the cache read command, output a cache read suspend command for suspending a cache read operation corresponding to the cache read command.

7. The storage device of claim 6, wherein the command controller is configured to, when the memory device suspends the cache read operation, output a random data input command for storing data stored in the program data storage in a latch allocated to perform the cache read operation among the plurality of latches included in the page buffer of the memory device.

8. The storage device of claim 7, wherein the program data storage is configured to again output the stored data to the memory device, and
wherein the memory device is configured to store the received data in the latch allocated to perform the cache read operation.

9. The storage device of claim 8, wherein the command controller is configured to output a resume command for again performing the program operation, and
wherein the memory device is configured to again perform a program operation corresponding to the resume command, based on data stored in the plurality of latches included in the page buffer.

10. A method for operating a storage device including a memory device for storing data, a memory controller for controlling the memory device, and program data storage for communicating with the memory device, the method comprising:
receiving a read request from a host while the memory device is performing a program operation;
generating a program suspend command for suspending the program operation, based on the read request;
outputting program data stored in any one latch among a plurality of latches included in a page buffer of the memory device to the program data storage; and
allocating the latch from which the program data is output as a cache latch for performing a cache read operation corresponding to the cache read command; and
performing a read operation corresponding to the cache read command or normal read command, based on a number of commands of a command queue in which a command corresponding to the read request received from the host is queued, when the program operation is suspended.

11. The method of claim 10, wherein performing a read operation corresponding to a cache read command or normal read command comprises:

performing an operation corresponding to the cache read command when the number of the commands queued in the command queue is greater than or equal to a first reference value, and performing an operation corresponding to the normal read command when the number of the commands queued in the command queue is smaller than the first reference value.

12. The method of claim 11, further comprising, when the number of commands queued in the command queue is greater than or equal to the first reference value, storing, in the program data storage, the program data before the operation corresponding to the cache read command is performed.

13. The method of claim 12, further comprising outputting a random data output command for outputting the program data to the memory device.

14. The method of claim 10, further comprising generating, when a number of read commands executed by the memory device reaches a second reference value after the cache read operation corresponding to the cache read command is started, the cache read suspend command for suspending the cache read operation corresponding to the cache read command.

15. The method of claim 14, further comprising storing data stored in the program data storage in the latch allocated to perform the cache read operation, when the cache read operation is suspended in response to the cache read suspend command.

16. The method of claim 15, further comprising:
generating a resume command for again performing the program operation; and
again performing the program operation, based on data stored in the plurality of latches included in the page buffer of the memory device, in response to the resume command.

* * * * *